March 30, 1937.　　　T. H. STRACHAN　　　2,075,554
MEAT SLICER
Filed Jan. 9, 1932　　　2 Sheets-Sheet 2
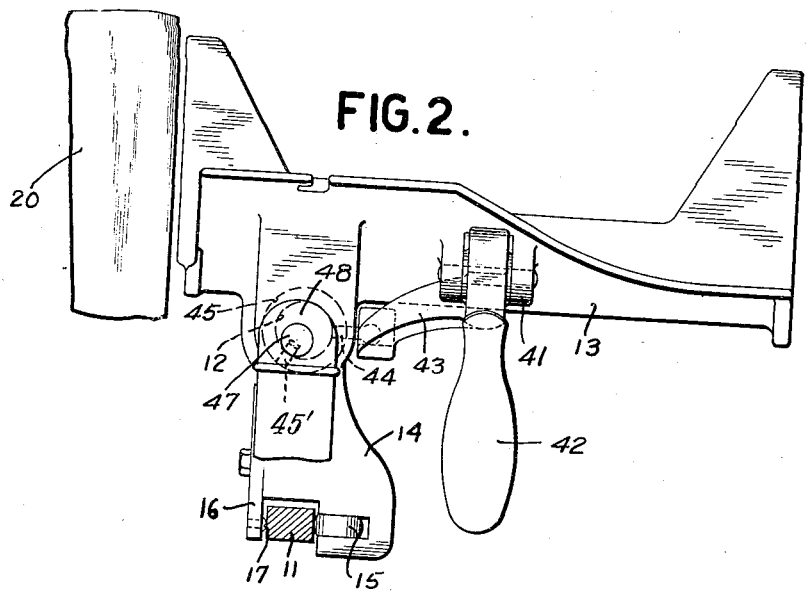
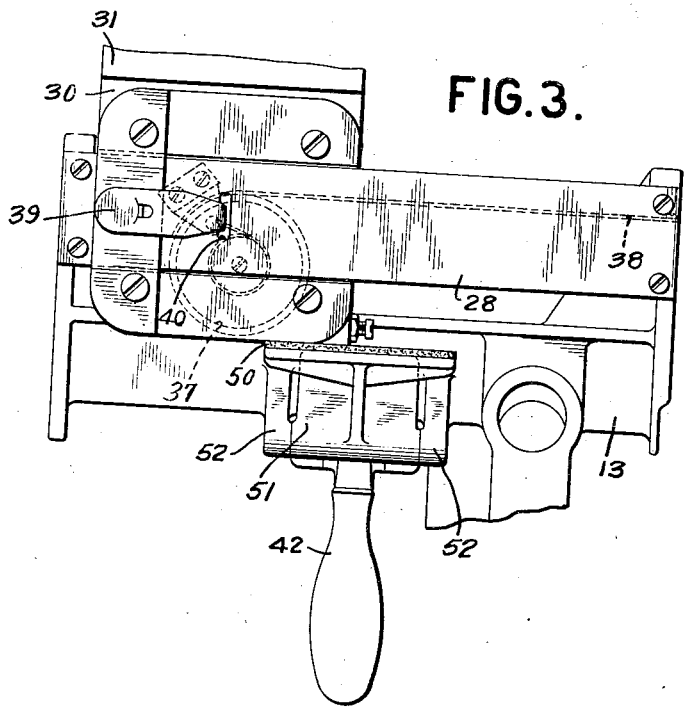

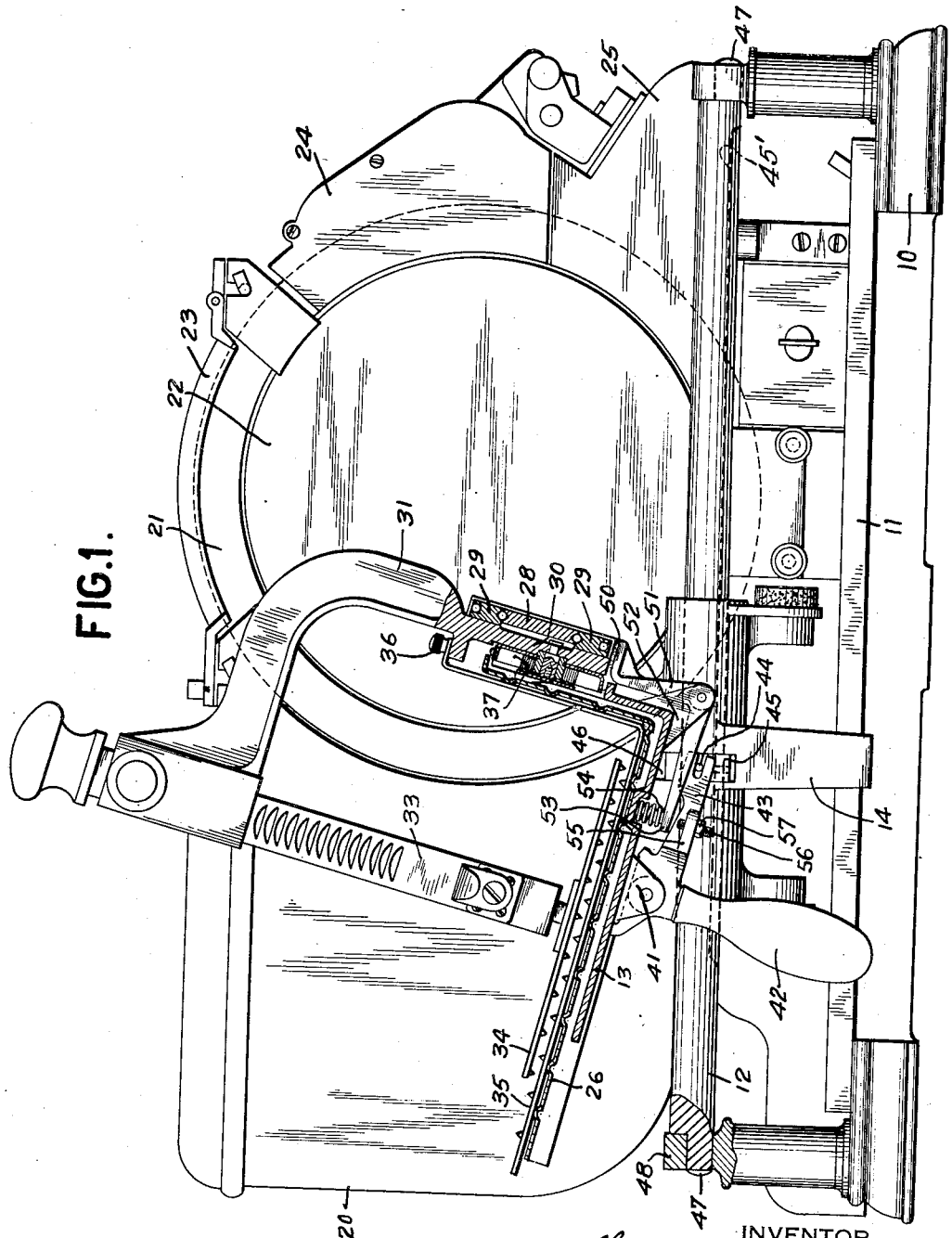

Patented Mar. 30, 1937

2,075,554

UNITED STATES PATENT OFFICE 2,075,554

MEAT SLICER

Thomas H. Strachan, Dayton, Ohio, assignor, by mesne assignments, to The Hobart Manufacturing Company, Troy, Ohio, a corporation of Ohio Application January 9, 1932, Serial No. 585,736

10 Claims. (Cl. 146—102)

This case relates to slicing machines and particularly to improvements in the article feeding means.

The type of machine to which the invention has been applied includes a gage plate for determining the thickness of the slice to be cut by a disk knife at the side of the gage plate. The article is held on a carriage which reciprocates across the face of the gage plate and the knife, each reciprocation resulting in the knife cutting one slice from the article. To advance the article towards the gage plate and transversely past the cutting edge of the knife at each reciprocation of the carriage, a feeding device is mounted on the carriage to move towards the knife and gage plate planes. In the present instance, the feeding device is automatically moved towards the plane of the gage plate by a spring drum.

In machines of this type, it has been found that the spring driven clamp when released to feed the article towards the gage plate may move suddenly and undesirably while the hand of the operator is in the path of the feeding device, or before the article has been properly positioned on the clamp. This may result in injury to the operator or the improper positioning of the article on the clamp.

Further, it has been found in these machines that when the carriage is on its return stroke and the article thereon is passing the front or cutting edge of the knife it will be moved by the automatic spring drive towards the gage plate and across the cutting edge of the knife which, being in rapid rotation, cuts particles off the article and gives it a ragged edge.

Furthermore, the pressure of the article against the cover plate of the knife and the gage plate on the return stroke produces a frictional retarding force which prevents rapid and easy reciprocation of the carriage.

The object of the invention is to provide novel means for feeding an article to and from a knife.

More specifically the object is to provide means for feeding an article to and from the cutting knife which will automatically prevent the dragging of the article while the carriage is on its return stroke.

Further, the object is to provide a feeding means for a traversing carriage which will control automatically the operation of the means for feeding the article towards the gage plate both on the feed and return strokes of the carriage.

Further, the object is to provide means to automatically upon return of the carriage to initial position render the means for moving the article towards the gage plate ineffective.

Still further, the object is to provide means for moving the carriage bodily away from the planes of the gage plate and knife during the return stroke of the carriage.

An object also is to combine means for preventing movement of the article towards the gage plate while the carriage is being returned with means for moving the carriage bodily away from the gage plate and knife.

Various other objects and advantages of my invention will be obvious from the following particular description of one form of mechanism embodying the invention or from an inspection of the accompanying drawings; and the invention also constitutes certain new and novel features of the construction and combination of parts hereinafter set forth and claimed.

In the drawings:

Fig. 1 is a view of the machine from the feed side.

Fig. 2 is a detail of the carriage looking at the front thereof and with the clamp removed.

Fig. 3 is a view looking at the rear of the carriage.

Referring to the drawings in detail, the machine has a base 10 on which are mounted a flat rail 11 and an upper round rail 12. A carriage 13 has an opening through which the rail 12 passes and a depending arm 14 carrying a roller 15 with a laterally rounded periphery which bears against the side of the flat rail 11. To limit movement of the carriage in a direction counterclockwise of the rail 11, (as viewed in Fig. 2) leg 14 has a plate 16, provided with a round headed pin 17, bearing against the side of rail 11 which is opposite the side engaged by roller 15. The carriage is reciprocable on rails 11 and 12 across the faces of the gage plate 20 and knife 21. The gage plate 20 is adjusted by suitable means (not shown) for determining the thickness of slice to be cut by the knife. The knife is covered at the carriage side by a circular cover plate 22 held within a circular recess in the knife so that the outer face of the disk 22 is substantially in the same plane as the rim of the knife 21. The knife is guarded at the top by a guard 23 and at the rear by guards 24 and 25. On the carriage is provided the porcelain tray 26 to receive the article. The carriage has at the rear side a rail 28 which extends perpendicularly to the gage plate and knife planes. Riding on the upper and lower edges of rail 28 are ball bearing races 29 secured to the side 30 of a clamp frame or bracket 31. The clamp frame is thus guided for movement on the carriage transversely to the gage plate and knife. The clamp frame 31 extends over the porcelain tray 26 and slidably carries a clamp post 33 for movement to and from the porcelain tray.

The post 33 carries at its lower end a spiked clamp plate 34 which confronts the spiked supplementary clamp plate 35, which has a vertical portion bent at its upper end into contact with the clamp frame 31 and fixed thereto by screw 36.

To automatically feed the clamp frame and the article gripped thereby towards the gage plate, a spring drum 37 is carried by the side 30 of the clamp frame and connected by a tape 38 to the end of the carriage adjacent the gage plate. The spring is wound up by moving the clamp frame away from the gage plate. The spring when released thereafter acts to move the clamp frame and the article gripped therewith towards the gage plate and knife. To hold the clamp frame in retracted position against the force of the spring, a latch 39 is pivotally carried on the outside of the clamp assembly. The nose end of the latch normally moves into a slot 40 in the rail 28 when the clamp is fully retracted and prevents the spring drum from moving the clamp towards the gage plate.

It may happen that latch 39 is released while the operator's hand is in front of the clamp setting the article on the carriage or before the article is set in desired position. In these cases, the spring drive will undesirably, suddenly impel the clamp forcibly against the operator's fingers or hand, thus injuring him or will displace the article from proper position.

Further, as the carriage is returning after a slice has been cut, the spring drum acts to move the portions of the article passing the knife edge towards the gage plate which is transversely spaced from the knife plane. As the knife is rotating rapidly, the result will be a cutting off of particles of the article and the producing of a ragged uneven edge on the article.

Further, during the return of the carriage, the spring drive forces the article hard against the knife cover plate 22 and against the gage plate. The resulting friction retards the action of the carriage.

It should be understood that even without an automatic clamp feed such as the spring drive, upon the return stroke of the carriage, the article would drag against the surfaces of the knife cover plate and the gage plate and the knife would also slice particles from the article portions passing the cutting edge.

The following means are provided to remedy all the aforementioned defects.

The bottom of carriage 13 is provided with a pair of ears 41 between which is journaled a handle member 42. The latter has a horizontal extension 43 forked at the free end to receive a pin 44 extending laterally from the side of a collar 45 which embraces and is slidably keyed by a key 45' to round rail 12. Collar 45 is seated between the walls of a slot 46 in the carriage and is thereby constrained to move together with the carriage when the latter is reciprocated.

At each end, rail 12 has eccentric reduced ends 47 journaled in post caps 48. When pin 44 is moved clockwise (as viewed in Fig. 2) collar 45 and shaft 12 to which it is keyed will also move clockwise and due to eccentricity of the ends 47 of rail 12, the latter will be displaced to the right (as viewed in Fig. 2) to tilt the carriage bodily clockwise about rail 12, the rounded periphery of roller 15 permitting this pivotal movement. As the carriage is displaced to the right, everything carried thereon will tend to move away from the knife and gage plate.

Where an automatic feed for the clamp is not provided, this movement of the carriage suffices to clear the article of the knife edge, the knife cover plate, and the gage plate during return of the carriage. Where an automatic drive is provided such as a spring drive, then means are provided to prevent the functioning of the automatic drive upon the return stroke of the carriage.

This means comprises a friction brake strip 50 adapted to engage the bottom of clamp frame portion 31 and the lower race 29 carried by said portion. The brake strip is fastened to the top of one arm 51 of a bell lever, journaled between ears 52 of the carriage. The other arm 53 of the lever is horizontally disposed beneath the carriage 13. A coil spring 54 between the carriage and arm 53 urges the bell lever counterclockwise (as viewed in Fig. 1) to engage the brake strip with the clamp and hold the latter against movement. Handle member 42 is provided at the side of horizontal extension 43 with a parallel shorter, horizontal extension 55 in which is threaded a screw 56. The upper end of the screw is adapted to engage the arm 53 of the brake lever and force it clockwise against resistance of spring 54 to thereby relieve the brake strip from the clamp frame and permit the spring drive to function and advance the clamp towards the gage plate. Screw 56 may be set in any adjusted position by lock nut 57.

When handle 42 is rocked counterclockwise relative to carriage 13, the screw 56 engages arm 53 to rock the brake lever clockwise and release the clamp for feeding. When the handle rocks clockwise relative to the carriage, the screw 56 is spaced from the brake lever arm 53 and spring 54 forces the brake lever counterclockwise to engage strip 50 with the clamp frame and prevent feeding thereof.

Since the handle 42 is initially rocked counterclockwise relative to the carriage into forward position when it is grasped to move the carriage on the forward stroke and this relative position of the carriage and handle is maintained so long as the handle is moving the carriage forward, it is evident that the brake is not engaged with the clamp during the forward stroke and therefore the spring drum is effective to advance the clamp and the article gripped thereby towards the gage plate and knife. During the forward stroke of the carriage, if the handle 42 is released by the operator, spring 54 will cause the brake to act and stop the clamp against transverse feeding movement. The operator can then adjust the article if he so desires without interference from unnecessary movement of the clamp. The carriage can also be held stationary and the handle rocked counterclockwise to release the brake and cause the clamp to feed the article towards the gage plate or knife, if so desired.

Upon the return stroke of the carriage, the handle 42 will be initially rocked clockwise into rear position relative to the carriage and held in this position while the handle is returning the carriage. As a result, the screw 56 will be removed from the arm 53 of the brake lever and spring 54 will force the brake strip 50 against the clamp to hold it against movement by the spring drive. Thus, the article will not be forced by the spring against the knife cover plate 22, knife rim, or gage plate 20 on the return stroke. Further, the article on the return stroke will not be fed past the knife edge towards the gage plate and there will be no tendency for knife to cut strips off the article on this stroke.

To further insure absolute clearance between the article and the gage plate, guard plates, cover plates and knife upon the return stroke, the carriage is bodily tilted away from these parts by the means hereinbefore described. Thus, on the forward stroke, handle 42 is rocked counterclockwise relative to the carriage and extension 55 and screw 56 release the brake from the clamp. Simultaneously, extension 43 through pin 44 rocks the collar 45 and rail 12 counterclockwise (as viewed in Fig. 2). This moves the carriage towards the gage plate into normal position shown in Fig. 2.

On the return stroke, the handle is rocked clockwise, removing screw 56 from the brake lever which thereupon acts to brake the clamp. Simultaneously, the collar 45 and shaft 12 are rocked clockwise, (as viewed in Fig. 2), tilting the carriage away from the gage plate, cover and guard plates, and the knife. Thus, the article is entirely removed from contact with these parts at the same time as the brake renders the automatic feed of the article inoperative. It will be noted that when the handle is released by the operator in order to place an article on the carriage or while cleaning the carriage or clamp, the brake will be in operation to prevent accidental, undesirable automatic movement of the clamp to the injury of the operator.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. A slicing machine comprising a rotary knife, a gage plate at the side of the knife and lying in a plane to the rear of and generally parallel to the knife plane, a carriage mounted for reciprocation past the gage plate and knife, clamping means mounted on the carriage, spring means normally urging the clamp to move an article on the carriage against the gage plate, a brake mounted on the carriage for engaging said clamping means to restrain movement thereof by said spring means towards the gage plate, a handle for reciprocating the carriage and pivotally mounted on the carriage for a limited swing relative thereto, the handle having means during its swing to control operation of the brake, and means also controlled by said handle for withdrawing said carriage from its operative path of movement upon the return stroke of said carriage to effect spacing thereof from said knife.

2. A slicing machine comprising a rotary knife, a gage plate at the side of the knife and lying in a plane to the rear of and generally parallel to the knife plane, a carriage mounted for reciprocation past the gage plate and knife, a pusher plate for moving an article on the carriage against the gage plate, a support for the pusher plate, guide means on the carriage coacting with the support for guiding the pusher plate and support to move transversely to the gage plate and knife, a spring drive for constantly urging the pusher plate and its support towards the gage plate and knife, a brake pivoted to the carriage for engaging said support to restrain movement thereof towards the gage plate and knife under the driving force of said spring drive, resilient means for normally urging the brake to engage said support, a handle pivotally mounted on the carriage for a limited forward and reverse swing relative thereto in the direction of movement of the carriage, the handle having means for engaging the brake during its forward swing to move the brake against the resistance of said resilient means out of restraining contact with the pusher plate support whereby the spring drive is effective to advance the pusher plate and the article engaged thereby towards the gage plate and to the rear of the cutting plane to enable the knife to cut a slice of the article during the forward stroke of the carriage, the handle engaging the carriage at the end of its forward swing to move the carriage on its forward stroke, said handle means releasing the brake during the reverse swing of the handle to render the brake effective to prevent movement of the pusher plate during the return stroke of the carriage, the handle engaging the carriage at the end of its reverse swing to move the carriage on its return stroke.

3. In a slicing machine, a knife and a carriage, guide tracks for slidably mounting the carriage to reciprocate in a definite path generally parallel to the cutting plane, a clamp mounted on the carriage to engage an article lying on the carriage, a spring drive for constantly urging the clamp to feed the article across the knife edge and towards the cutting plane to enable the knife to cut a slice from the article during the reciprocation of the carriage, means automatically operable upon reciprocation of the carriage for periodically restraining movement of the clamp and the article towards the cutting plane by the force of the spring drive, and means jointly operable with the first named means for periodically moving the carriage on said guide tracks transversely to and away from the cutting plane and a common actuator having separate actuating connections to the means for restraining movement of the clamp and the means for moving the carriage transversely away from the cutting plane for substantially simultaneously and jointly operating both said means.

4. A slicing machine of the character described comprising a knife, a gage plate, an article carrier reciprocable with respect to said knife and adapted to support an article in cutting relation with said knife, means for normally urging the article toward the knife and gage plate prior to each active stroke of the carriage, manually operable means for reciprocating the carrier and mounted thereon for movement relative thereto, and means operated by movement of the manually operable means relative to the carrier on the return stroke operation thereof for effecting lateral spacing of said article away from said knife.

5. A slicing machine of the character described comprising a knife, a carriage reciprocable with respect to said knife, an article clamp carried by said carriage, spring means for urging said article clamp toward said knife prior to each forward stroke of said carriage, means for limiting the action of said spring means, manually operable means for reciprocating said carriage and mounted thereon for movement relative thereto, and means operated by movement of the manually operable means relative to said carriage on the return stroke of the carriage for effecting lateral spacing of the article away from said knife.

6. A slicing machine comprising a knife, a reciprocable carriage movable substantially parallel with the knife so as to have a forward cutting stroke and a return idle stroke, an article clamp mounted in the carriage for movement transversely of the knife and relative to said carriage, a gage plate for limiting movement of the article transversely of the knife to regulate the thickness of the slices, means for normally urging the article clamp toward the gage plate prior to each forward stroke of the carriage, manually operated means pivotally mounted on the carriage for reciprocating the carriage, and means operating by pivotal movement of the reciprocating means relative to the carriage on the return stroke operation of the carriage for moving the clamp away from the knife.

7. In a slicing machine of the character described, the combination of a rotary slicing knife, a work supporting carriage mounted for a reciprocating work stroke and return stroke across the face of the knife, a gage plate, means for normally urging the work material toward the gage plate to position the material for the slicing stroke, manually operable means mounted on said carriage for reciprocating said carriage and movable relatively thereto in the return stroke of the carriage, and spacing means operated by said manually operable means and operable in any position of the carriage in response to actuation and movement of said manually operable means in effecting return movement of said carriage for moving the work material out of contact with the knife.

8. A slicing machine of the character described comprising a knife, an article carrier reciprocable with respect to said knife and adapted to support an article in cutting relation with respect thereto, means for feeding the article toward said knife, a manually operable member for reciprocating said carriage and mounted thereon for movement relative thereto, means for urging said member to one position of adjustment, and means controlled by said member in its movement to said position for effecting lateral spacing of said article away from said knife.

9. A slicing machine of the character described comprising a knife, an article carrier reciprocable with respect to said knife and adapted to support an article in cutting relation with respect thereto, means for feeding the article toward said knife, a manually operable member for moving said carriage and carried thereby, adjustable means under control of the operator in the operation of said member movable to one position of adjustment, means controlled by said adjustable means in its movement to said position for effecting lateral spacing of said article away from said knife, and means for urging said member to said one position of adjustment.

10. A slicing machine of the character described comprising a knife, an article carrier reciprocable with respect to said knife and adapted to support an article in cutting relation with respect thereto, means for feeding the article toward the knife, means for limiting the action of said feeding means, a manually operable member for reciprocating said carriage and mounted thereon for movement relative thereto in the plane of reciprocation of the carriage, means for urging said member to one position of adjustment, and means controlled by said member in its movement to said one position of adjustment for effecting application of said feed limiting means.

THOMAS H. STRACHAN.